Patented Oct. 26, 1943

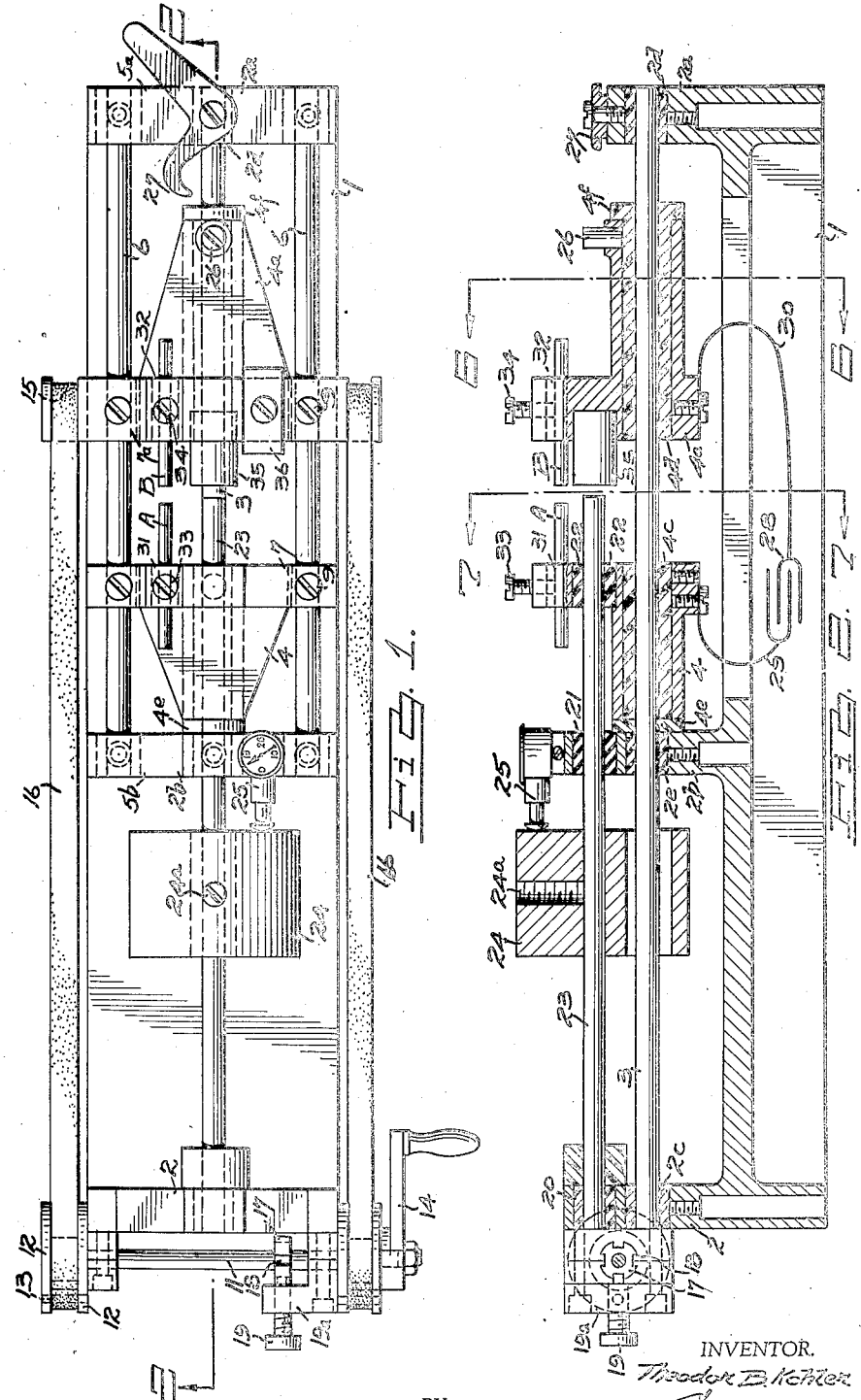

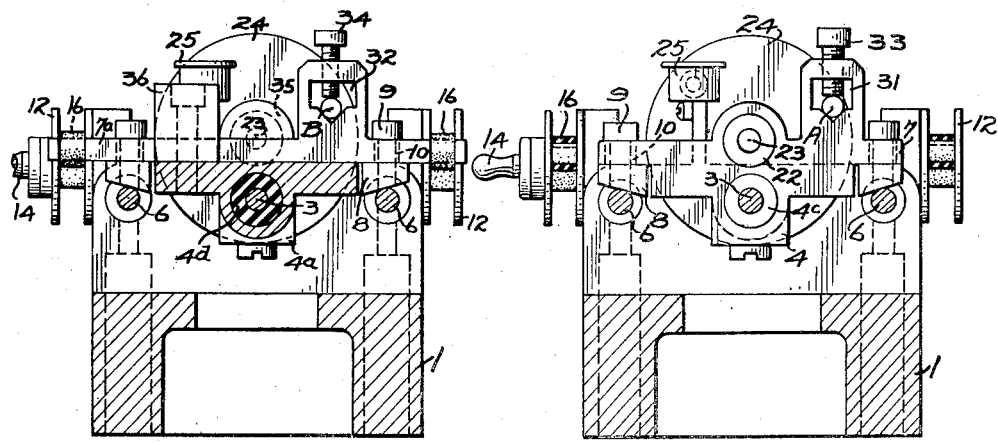
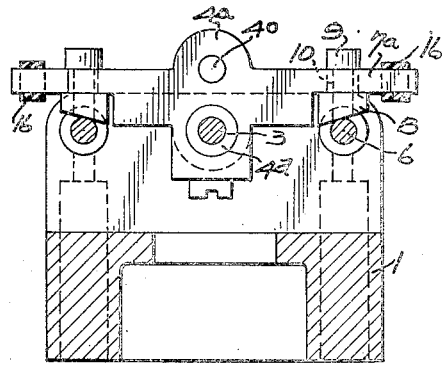
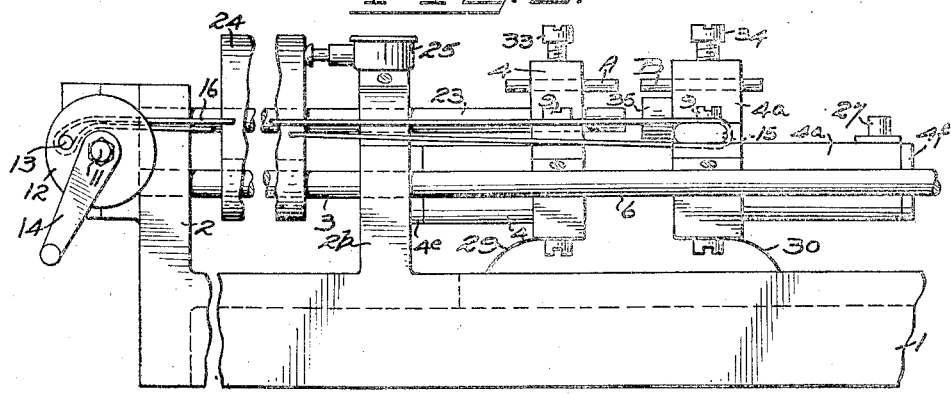

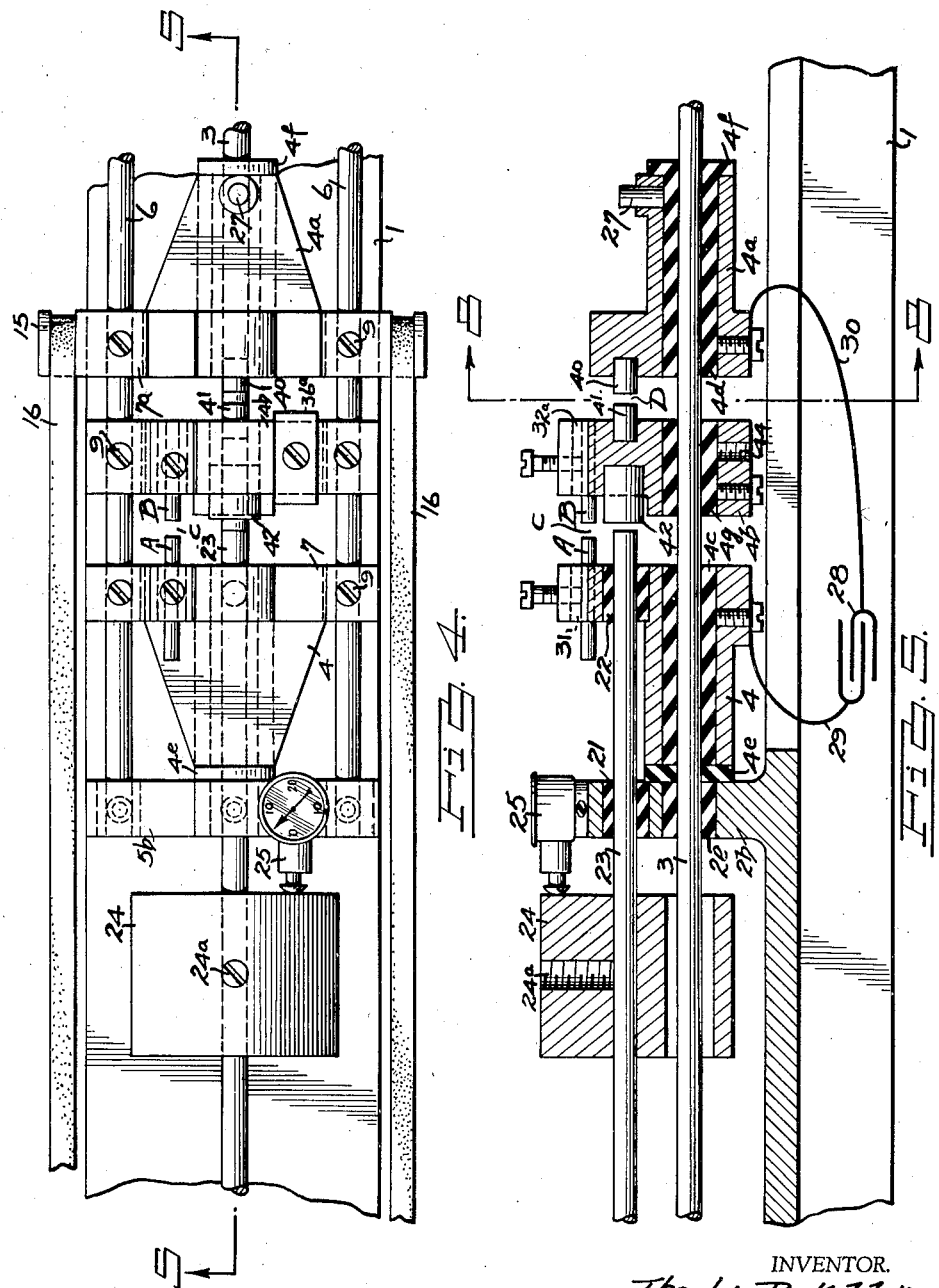

2,332,581

UNITED STATES PATENT OFFICE 2,332,581

ELECTRIC WELDING MACHINE

Theodor B. Kohler, Detroit, Mich.

Application August 7, 1942, Serial No. 453,995

14 Claims. (Cl. 219—4)

This invention relates to improvements in electric welding machines. In electric welding the function is to increase the normal electronic flow upon and immediately adjacent the surfaces to be welded so that they form an electronic flux as they come into contact and a narrow weld is formed. Moreover the electronic flux should be uniformly distributed across the entire opposed surfaces being welded so that the resultant weld is uniform. When welding it is customary to mount the work pieces for movement toward one another and to connect them, through suitable means, to an electric circuit so that when they come into contact a circuit is completed through them, and a spark gap is formed between them prior to the actual contact being made.

It is an object of this invention to provide an electric welding machine having means for moving the work pieces toward one another at a high rate of speed past the spacing at which a spark gap is formed between them to quickly overcome the impedance due to the formation of the gap, and then to suddenly stop, or almost stop, this movement at least once between the time the spark gap has been formed and the work pieces come into actual contact. After the speed of approach has been checked the work pieces move relatively slowly into contact, thereby giving ample time for full lateral distribution of the electronic flow over their entire cross sections, and also this slower final movement prevents the work pieces coming into contact with any appreciable impact so that the electronic flux is not disturbed as the weld is being knit.

Another object of the invention is to provide an electric welding machine including means for suddenly and momentarily stopping, or almost stopping, the relative approach of the work pieces at least once after they have rapidly passed through the point at which the spark gap is formed, to impart a mechanical shock to release any sluggishly flowing electrons and to insure that all electrons upon and immediately adjacent the opposed surfaces being welded are in movement, to obtain uniformity in the electronic flux by which the weld is made.

A further object of the invention is to provide an electric welding machine including means for adjusting the spacing between the carriages and the work pieces at which this sudden stoppage and mechanical shock occurs, since the maximum width of the spark gap depends both upon the voltage employed and also upon the materials being welde and the shock should occur after the impedance attributable to the formation of the spark gap has been overcome. The means for moving the carriages relative to one another operates both prior to and after the mechanical shock has been imparted, and means may be provided for regulating the speed of approach of the carriages after the mechanical shock has been imparted.

Another object of the invention is to provide an electric welding machine wherein balancing means are provided for retaining the work pieces in alignment throughout their relative movement and particularly when the mechanical shock is imparted.

Another object of the invention is to provide an electric welding machine in one modification of which a divided spark gap comprising a welding gap and a contact gap is employed. The welding gap occurs between the two work pieces, the maximum spacing between which is less than the total spark gap, and the contact gap is formed between an intermediate carriage mounted for movement and by which one of the work pieces is supported, and another movable carriage which is arranged to rapidly approach the intermediate carriage and thus rapidly form and close the contact gap. In that way the movement of the work pieces relative to one another is materially limited during the welding operation.

Another object of the invention is to provide such an electric welding machine including a divided spark gap. By dividing the spark gap and connecting the intermediate carriage into the circuit through another movable carriage the spark gap is only formed when the latter movable carriage is in close proximity to the intermediate carriage, so therefore when the said other carriage is withdrawn from the intermediate carriage re-charging of the unit may be effected without causing a short between the work pieces and their supports.

Exhaustive experiments have shown that by correct timing—that is correct speed during which the spark gap is formed and correct retardation of the carriage movement after the mechanical shock has been imparted—excellent welds may be obtained with no noise due to electrical action and an almost imperceptible spark, and the resultant welds show absolutely no signs of heat.

Having thus briefly stated some of the objects and advantages of the invention I will now proceed to describe the invention with the aid of the accompanying drawings, in which:

Figure 1 illustrates a plan view of the invention,

Figure 2 is a section on the line 2—2 of Figure 1 but including the indicator, and Figure 3 is a partial side elevation thereof, Figure 4 is a plan view showing a modified construction, and Figure 5 is a section on the line 5—5 of Figure 4 but showing the indicator, Figures 6 and 7 are sections on the lines 6—6 and 7—7 respectively of Figure 2, and Figure 8 is a section on the line 8—8 of Figure 5.

Referring to the drawings, 1 designates a bed of the machine having integral bearings 2, 2a and 2b provided with insulating bushings 2c, 2d and 2e respectively. The bearings 2 and 2a and their insulating bushings 2c and 2d respectively are located at opposite extremities of the bed and support opposite ends of a single, continuous carrier member 3 which is also intermediately supported in the bushing 2e in the intermediate bearing 2b. Mounted between the bearings 2b and 2a for axial movement upon the carrier member 3 and insulated therefrom by insulating sleeves 4c and 4d are carriages 4 and 4a respectively. 4e denotes a resilient insulating washer which at all times retains the carriage 4 spaced from the bearing 2, and a similar washer portion 4f is preferably made integral with one extremity of the insulating sleeve 4d to retain the carriage 4a spaced at all times from the bearing 2a. The carriage 4 normally rests against the insulating washer 4e while the carriage 4a is axially moved by means hereinafter described. Extending between and supported by lateral projections 5b and 5a integral with the bearings 2b and 2a respectively are guide rods 6, and projecting laterally from the carriages 4 and 4a are integral arms 7 and 7a respectively which extend over the guides 6 and prevent rotation of the carriages about the carrier member 3. To permit adjustment and insure the desired bearing upon the rods 6 wedge-shaped members 8 are mounted on the underside of the said arms for lateral movement thereon, and are secured by screws 9 which extend through elongated arm slots 10.

Mounted transversely across one extremity of the bed 1 is a spindle 11 having a pair of discs 12 fixed thereon adjacent each side of the bed and preferably outwardly thereof. Extending between each pair of discs 12 and carried thereby are eccentrically arranged pins 13, and 14 denotes a crank on one extremity of the spindle for turning the latter. Formed around the rear sides of the arms 7a toward their outer extremities are substantially semi-circular grooves 15 around each of which one extremity of a resilient band 16 passes while the other end of each band passes around one of the pins 13 so that the tendency of these bands is to draw the carriage 4a toward the carriage 4. Mounted for rotation with the spindle 11 is a locking member 17 having a plurality of radial slots 18 therein any one of which may be engaged by a locking pin 19 axially movable through a suitable fixed element 19a. Thus by rotating the spindle 11 the tension of the bands 16 may be adjusted and the spindle then held against accidental rotation by the locking pin 19.

Supported in insulated bearings 20, 21 and 22 integral with the bearings 2, 2b and the carriage 4 respectively is an axially movable bumper bar 23 which extends in vertical alignment with the carrier member 3; and secured upon this bar 23 as by a set screw 24a, and positioned between the bearings 20 and 21 is a weight 24 which is preferably apertured to encircle and remain spaced from the member 3. Provided upon the bearing 21 is a depth gauge 25 by which the distance of the weight therefrom, and therefore the projection of one extremity of the bumper bar 23 in front of the bearing 22 may be accurately adjusted. Means are also provided for holding the carriage 4a adjacent the bearing 2a when the bands 16 are under tension, and consists in the present instance of a pin 26 projecting upwardly from the carriage 4a which may be engaged by a catch 27 pivoted on the bearing 2a. From a condenser unit 28 leads 29 and 30 extend which are connected to the carriages 4 and 4a respectively.

Referring now to Figures 1, 2, 3, 6 and 7, wherein the carriages 4 and 4a support work pieces A and B respectively and the approach of the carriage 4a toward the carriage 4 is checked only once prior to the said work pieces being brought into actual contact with one another. In this instance aligned apertures 31 and 32 are provided in the carriages 4 and 4a parallel with but on one side of the axis of the member 3 to receive the work pieces A and B which are secured as by set screws 33 and 34 respectively, and project toward one another. Projecting from the carriage 4a is a block 35 positioned to strike the bumper bar 23 and momentarily stop, or almost stop, the advance of the carriage 4a when the latter is being moved toward the carriage 4 by the resilient bands 16. To what extent the carriage 4a is arrested, and whether it is completely stopped or not, depends of course upon several factors, among them the tension of the bands 16, and the relative weights of the carriage 4a and of the bumper bar 23 and the weight 24 thereon. Mounted also upon the carriage 4a is a balance weight 36 which is positioned on the opposite side of the carriage to the workpiece receiving aperture 32 to offset any tendency for the carriage 4a to twist upon the carrier member 3 particularly when the bumper block 35 and the bar 23 come into contact, since any such twisting movement would interfere with the alignment of the work pieces A and B.

The operation is briefly as follows: After the work pieces A and B have been secured in their respective apertures 31 and 32 the bumper bar 23 should be so set that the block 35 strikes it when the said work pieces are a predetermined distance apart, usually about one-half the maximum length of the spark gap. This is because the speed of approach of the carriage 4a should be as rapid as possible until the impedance due to the formation of the spark gap has been overcome. The mechanical shock caused by contact of the block 35 with the bumper bar 23 aids transverse distribution of the electronic flow after the strength of the latter has been increased by the current flowing across the spark gap. The bands 16, after the shock has been imparted, cause resumption of movement of the carriage 4a at a slower speed until the work piece B comes into contact with the work piece A, and during that time ample opportunity is afforded for the formation of the electronic flux by which the work pieces are knit upon contact, and this flux, which is in no sense a melting or partial melting of the metals of the work pieces, is not disturbed by contact of the work pieces as no sudden impact occurs. The work pieces merely slide relatively slowly together. During the operation the balance weight 36 insures the work pieces remaining in alignment; the depth gauge 25 permits exact setting of the bumper bar 23 so that the mechanical shock is imparted when the work pieces are at the desired spacing; and the crank 14 permits adjustment of the tension of the bands 16, so that the desired speed is attained both prior and subsequent to the bumper bar 23 and block 35 coming into contact, after which of course the former is moved axially to the left—Figure 2—until the work pieces come into contact.

Referring now to the modification shown in Figures 4, 5 and 8 an intermediate carriage 4b, positioned between the carriages 4 and 4a, is mounted for sliding movement upon the carrier member 3 and is insulated therefrom by an insulating sleeve 4g. Aligned contact bumpers 40 and 41 project toward one another from adjacent sides of the carriage 4a and the intermediate carriage 4b respectively, and projecting from the opposite side of the latter carriage 4b is an intermediate bumper 42 to contact the bumper bar 23. Moreover it will be noted that the contact bumpers 40 and 41, the intermediate bumper 42 and the bumper bar 23. are preferably all in alignment. The leads 29 and 30 from the condenser unit 28 are again connected to the carriages 4 and 4a respectively. Provided in the carriages 4 and 4b are suitable means for supporting the work pieces A and B, such as the work receiving apertures 31 and 32a, and the balance weight 36a is now provided upon the intermediate carriage 4b. The spark gap is divided into a welding gap C between the work pieces and a contact gap D between the contact bumpers 40 and 41.

In this instance the bumper bar 23 is so set that it is spaced from the intermediate bumper 42 a distance less than the initial spacing of the welding gap C before the welding operation is commenced. When the carriage 4a is released and moved to the left—Figure 4—by the bands 16 its speed increases until the contact bumpers 40 and 41 come into engagement by which time the spark gap has been formed and the contact gap D closed. After the mechanical shock resulting from this impact has been imparted to the intermediate carriage 4b the latter is advanced until the intermediate bumper 42 contacts the bumper bar 23 when a second mechanical shock is imparted to the said carriage. After that the bands 16 again cause resumption of movement of the carriages 4a and 4b and the work piece B slides relatively slowly into contact with the work piece A. Or, if desired, the bumper bar 23 may be set sufficiently far to the left—Figure 4—prior to operation of the machine to eliminate the second mechanical shock. The speed of movement of the carriage 4b may also be controlled by a preloading screw 44 to create frictional resistance and retard the movement of the carriage along the carrier member 3.

The modified construction above described is of advantage in cases where: it is desirable to control the speed of final movement and to vary it without altering the initial speed of the carriage 4a; and where only limited movement of the work pieces relative to one another is desirable.

While in the foregoing the preferred embodiments of the invention have been described and shown, it is understood that alterations and modifications may be made thereto provided they fall within the scope of the appended claims.

What I claim is:

1. An electric welding machine comprising two carriages movable relatively toward one another each supporting a work piece so that upon completion of the relative movement the work pieces are in physical contact, an electric circuit including said work pieces so arranged that it is closed upon physical contact of the work pieces and across a spark gap between them prior to said physical contact being made, mechanical means for rapidly forming said spark gap and completing the relative carriage movement until the work pieces come into physical contact, and means for arresting the operation of said mechanical means after the spark gap has been formed whereby the relative carriage movement then brings said work pieces more slowly into physical contact.

2. An electric welding machine comprising two carriages movable relatively toward one another, each supporting a work piece so that upon completion of the relative movement the two work pieces are in physical contact, an electric circuit including said work pieces so arranged that it is closed upon physical contact of said work pieces and across a spark gap between them prior to said physical contact being made, a mechanism including resilient means for rapidly forming said spark gap and for subsequently moving the carriages relatively until the work pieces come into physical contact, and means for momentarily arresting the action of the resilient means after formation of the spark gap whereby the relative movement of the carriages bringing the work pieces into physical contact is relatively slow.

3. An electric welding machine comprising a stationary and a movable carriage each supporting a work piece so that upon completion of movement of the movable carriage the work pieces are in physical contact, an electric circuit including said work pieces so arranged that it is closed upon physical contact of the work pieces and across a spark gap between them prior to the physical contact being made, mechanical means for rapidly closing said spark gap and subsequently moving the movable carriage and bringing its work piece into physical contact with the other work piece, and means for retarding the operation of said mechanical means after the spark gap has been formed whereby the movable carriage then moves its work piece slowly into physical contact with the other work piece.

4. An electric welding machine comprising a stationary and a movable carriage each supporting a work piece so that upon completion of movement of the movable carriage the work pieces are in physical contact, an electric circuit including said work pieces so arranged that it is closed upon physical contact of the work pieces and across a spark gap between them prior to said physical contact being made, and a mechanism including resilient means for rapidly forming the spark gap and subsequently moving the movable carriage until said work pieces are brought into physical contact, and means for abruptly checking the action of said resilient means after the spark gap has been formed whereby the work pieces are then moved relatively slowly into physical contact.

5. An electric welding machine comprising two relatively movable carriages each supporting a work piece so that upon completion of the relative movement the work pieces are in physical contact, an electric circuit including said work pieces so arranged that it is closed upon physical contact of the work pieces and across a spark gap between them prior to said physical contact being made, means for rapidly moving said carriages relatively toward one another until the spark gap has been formed and for continuing said movement until the work pieces come into physical contact, and means for arresting the relative carriage movement after the formation of the spark gap whereby the work pieces then move relatively slowly into physical contact.

6. An electric welding machine comprising a stationary and a movable carriage each supporting a work piece, an electric circuit including said work pieces so arranged that it is closed upon physical contact of said work pieces and across a spark gap prior to said physical contact being made, a mechanism including resilient means under tension for rapidly moving the movable carriage toward the stationary carriage until the spark gap has been formed and for continuing said movement until the work pieces come into physical contact, and means for abruptly arresting the movement of said movable carriage after the spark gap has been formed after which the movable carriage moves more slowly until the physical contact has been made.

7. An electric welding machine comprising two relatively movable carriages, each supporting a work piece resilient means under tension for moving said carriages relatively toward one another to bring the work pieces into physical contact, means for abruptly checking said movement and thereby imparting a mechanical shock to one work piece prior to the work pieces coming into physical contact whereby the initial speed is greater than the final speed after the movement has been checked, and an electric circuit adapted to be completed through said work pieces.

8. An electric welding machine comprising two carriages one of which is movable toward the other and each carriage supporting a work piece, an electric circuit including a condenser and said work pieces so arranged that it is closed when the work pieces are in physical contact and a spark gap is formed between them prior to said physical contact being made, resilient means for moving the movable carriage rapidly toward the other carriage, a yielding bumper means on said machine, and a bumper on said movable carriage to contact the bumper means after the spark gap has been formed to suddenly arrest the movement of said movable carriage and impart a mechanical shock to the work piece supported thereby, said resilient means then overcoming the resistance of the bumper means and continuing the carriage movement until the work pieces come into physical contact.

9. The combination set forth in claim 8, including a fixed bearing behind the other carriage, and a resilient cushion between the bearing and said other carriage.

10. The combination set forth in claim 8, wherein the work piece supporting means on the two carriages are in alignment and toward one side of their respective carriages, and a balance weight on the other side of the movable carriage.

11. An electric welding machine comprising separate supporting means for two work pieces, a movable carriage, means for rapidly moving the latter into contact with one of the supporting means, an electric circuit including the two work pieces and the movable carriage, said work pieces being initially spaced a distance less than the maximum length of the spark gap between them, the spark gap being divided and being formed partly between said work pieces and partly between the movable carriage and the work piece supporting means contacted by the latter whereby the spark gap is formed upon rapid approach of the movable carriage toward the work piece supporting means it contacts, the carriage movement being suddenly arrested upon contact with the work piece supporting means, and said carriage moving means then continuing the carriage movement and also moving the work piece supporting means it contacted to bring the work pieces slowly into physical contact.

12. An electric welding machine comprising the combination set forth in claim 11, including means for suddenly arresting the movement of the work supporting means after its movement has been commenced by the movable carriage and prior to the work pieces making physical contact.

13. The combination set forth in claim 11, including means for varying the speed of travel of the work supporting means moved by the movable carriage without affecting the speed of movement of the latter prior to its contact with the work supporting means.

14. An electric welding machine comprising two carriages relatively movable toward one another, each carriage supporting a work piece, an electric circuit including a condenser unit and said work pieces, mechanical means for moving the carriages toward each other to permit a discharge between the work pieces prior to their coming into physical contact, means for imparting a mechanical shock to one work piece while the discharge is taking place between the work pieces and before they physically contact one another, said mechanical means then moving the work pieces into physical contact.

THEODOR B. KOHLER.